(12) United States Patent
Chen et al.

(10) Patent No.: US 6,442,322 B1
(45) Date of Patent: Aug. 27, 2002

(54) OPTICAL FIBER MANAGEMENT DEVICE

(75) Inventors: Jianyao Chen, San Jose; Tom O'Dell, Campbell; Sam Huang, Fremont; Matthew Derstine, Sunnyvale, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/741,865

(22) Filed: Dec. 22, 2000

(51) Int. Cl.7 .............................. G02B 6/00; G02B 6/38
(52) U.S. Cl. ......................... 385/137; 385/63; 385/65; 385/66
(58) Field of Search .................. 385/137, 134, 385/121, 120, 66, 65, 63, 58

(56) References Cited

U.S. PATENT DOCUMENTS

| | | | |
|---|---|---|---|
| 4,744,629 A | 5/1988 | Bertoglio et al. | |
| 4,884,862 A | 12/1989 | Kofod | 350/96.2 |
| 4,989,945 A | 2/1991 | Ohkura | 350/96.2 |
| 5,239,609 A | 8/1993 | Auteri | 385/136 |
| 5,712,937 A | * 1/1998 | Asawa et al. | 385/49 |
| 5,732,181 A | 3/1998 | Engberg et al. | 385/139 |
| 5,771,324 A | * 6/1998 | Hargis | 385/43 |
| 5,781,678 A | * 7/1998 | Sano et al. | 385/45 |
| 6,005,991 A | 12/1999 | Knasel | 385/143 |

* cited by examiner

Primary Examiner—Brian Sircus
Assistant Examiner—Chandrika Prasad
(74) Attorney, Agent, or Firm—LaCasse & Associates, LLC

(57) ABSTRACT

This invention relates to an optical fiber management device that allows optical fiber to be placed in very restricted areas such as small modules. This device also provides an embedded conduit system that prevents the optical fibers from over bending and inhibits optical transmission. Moreover, the device of the present invention allows free movement of the optical fibers therethrough, if necessary. The result is a flexible and useful way to manage the location of the optical fibers and facilitate the connection of optical adapters.

9 Claims, 4 Drawing Sheets

OPTICAL FIBER MANAGEMENT DEVICE

The present invention relates to an optical fiber management device, and in particular to a device for controlling optical fiber routing in confined spaces, while minimizing light loss and fiber damage by preventing the fibers from exceeding their critical bending radius.

BACKGROUND OF THE INVENTION

In general, the devices and assemblies that are currently available for fiber-optic management are used to position and arrange cables inside of large cabinets or cabling trays. Unfortunately, these devices do not present any means that would allow one to correctly align individual fiber optic cables in very restricted areas, such as those in small modules. Devices such as those disclosed in U.S. Pat. No. 4,305,642 (issued to Bloodworth et al, Dec. 15, 1981); U.S. Pat. No. 4,744,629 (issued to Bertoglio, May U.S. Pat. No. 17, 1988); 4,884,862 (issued to Kofod, Dec. 5, 1989); U.S. Pat. No. 4,989,945 (issued to Ohkura, Feb. 5, 191); U.S. Pat. No. 5,239,609 (issued to Auteri, Aug. 24, 1993); and U.S. Pat. No. 5,732,181 (issued to Engberg et al, Mar. 24, 1998) relate to fiber transition devices for protecting optical fibers in the transition from a ribbon to individual fibers. Most of these devices have relatively bulky parts and do not deal with the problem inherent in bending fiber in a restricted space.

A device called Optiflex™, marketed by Lucent, is used to arrange complicated arrays of fiber optical cables in large cabinet structures, and is not for use in a small package such as a module. U.S. Pat. No. 6,005,991 issued Dec. 21, 2000 to Donald L Knasel discloses a device including a series of parallel fibers fixed between two sheets. These prior art devices rigidly fix cables or groups of fiber optic cable therein. Unfortunately, when the cable cannot be moved into or out of these devices after being installed, problems can arise. For example, if an end of an optical fiber has been damaged and extra splice length has not been left, there is no easy way in which the length of the optic fiber can be adjusted to create additional splice length for attaching a new fiber connector. This problem can also occur when replacing an existing connector with a different type of connector. Both of these problems would normally result in the complete replacement of the device, even if only one of the fibers is damaged.

SUMMARY OF THE INVENTION

An object of the present invention is to overcome the shortcomings of the prior art by providing a compact and flexible device for managing optical fiber in a small modular component or system. The system has individual support for each optical fiber, prevents over bending of the fibers, and allows the fibers to move therethrough with ease.

Accordingly the present invention relates to an optical fiber management device for directing optical fibers in a module and for facilitating the connection of adapters on the ends of the fibers. The module comprises two sides extending between two ends. The optical fiber management device comprising substantially planar housing means adapted to be positioned within the module; and a plurality of conduit means extending through the housing means for spreading out a plurality of optical fibers grouped along one side of the module into a spaced apart relationship along one end of the module. The conduit means are adapted to prevent the fibers from exceeding their critical bending radius. The fibers are freely slideable within the conduit means to enable extra fiber to be pulled therethrough, if necessary.

BRIEF DESCRIPTION OF THE DRAWINGS

The invention will be described in greater detail with reference to the accompanying drawings, which illustrate a preferred embodiment of the invention, wherein.

DETAILED DESCRIPTION OF THE DRAWINGS

Figure 1:
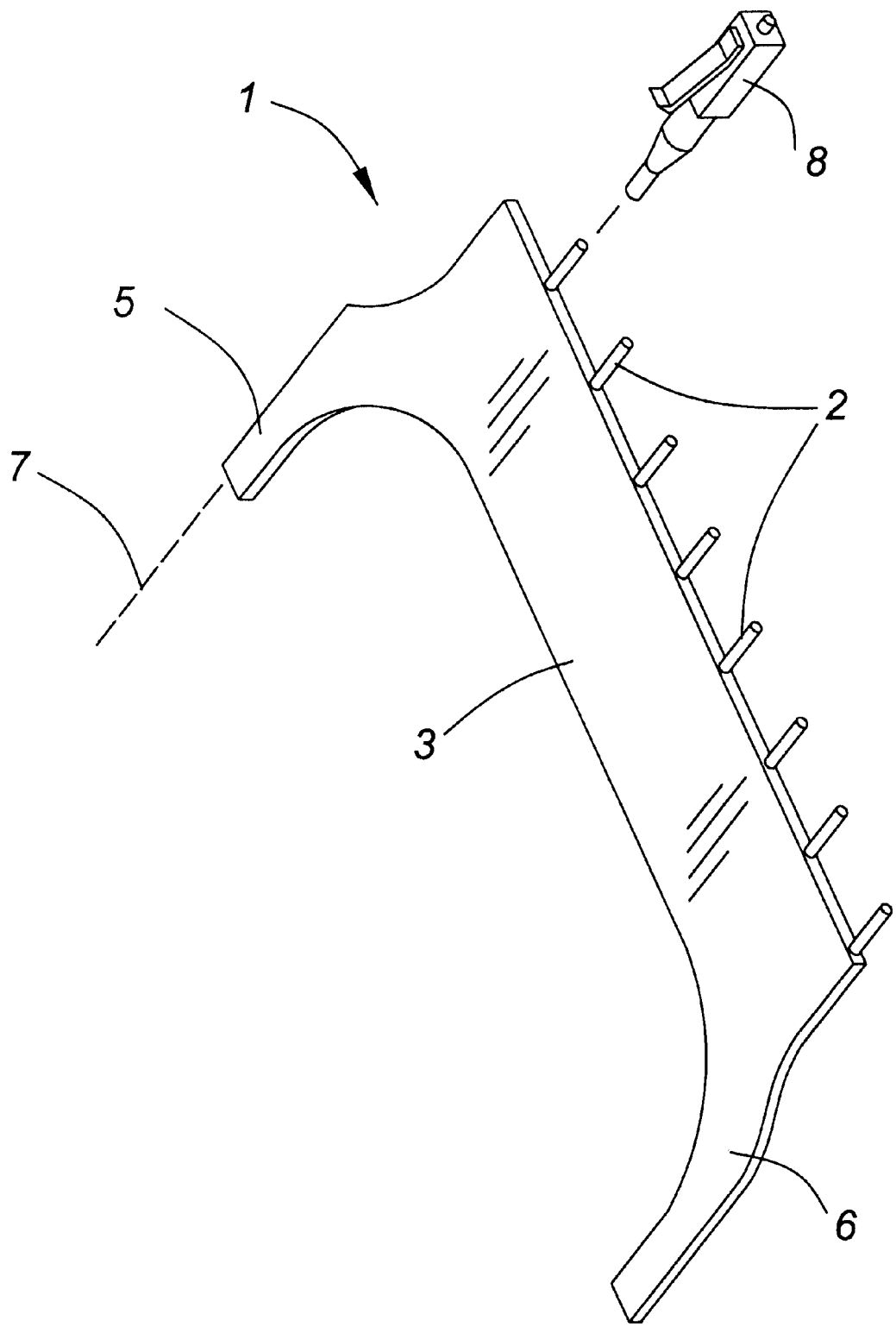
FIG. 1 is an isometric view of the fiber management device according to the present invention.

With reference to FIG. 1, the optical fiber management device according to the present invention includes a housing, generally indicated by 1, with a plurality of conduits 2 extending therethrough. The housing includes a top supporting layer 3 and a bottom supporting layer 4. Both of the supporting layers 3 and 4 can be constructed of the same flexible material or one of the supporting layers can be flexible while the other supporting layer is solid. The solid supporting layer facilitates mechanical attachment of the housing. In the embodiment of FIG. 1, the housing 1 is unshaped and therefore symmetrical about its central axis, with a left side arm 5 that fans out the plurality of conduits on the left side and a right side arm 6 that fans out the plurality of conduits on the right side. This symmetry is due to the module requirements, and if the shape of the module is asymmetric the optical fiber management device can then be altered to fit the new module shape. One optical fiber 7, shown in broken line, is positioned in the housing 1 with a connector 8 mounted on one end thereof.

Figure 2:
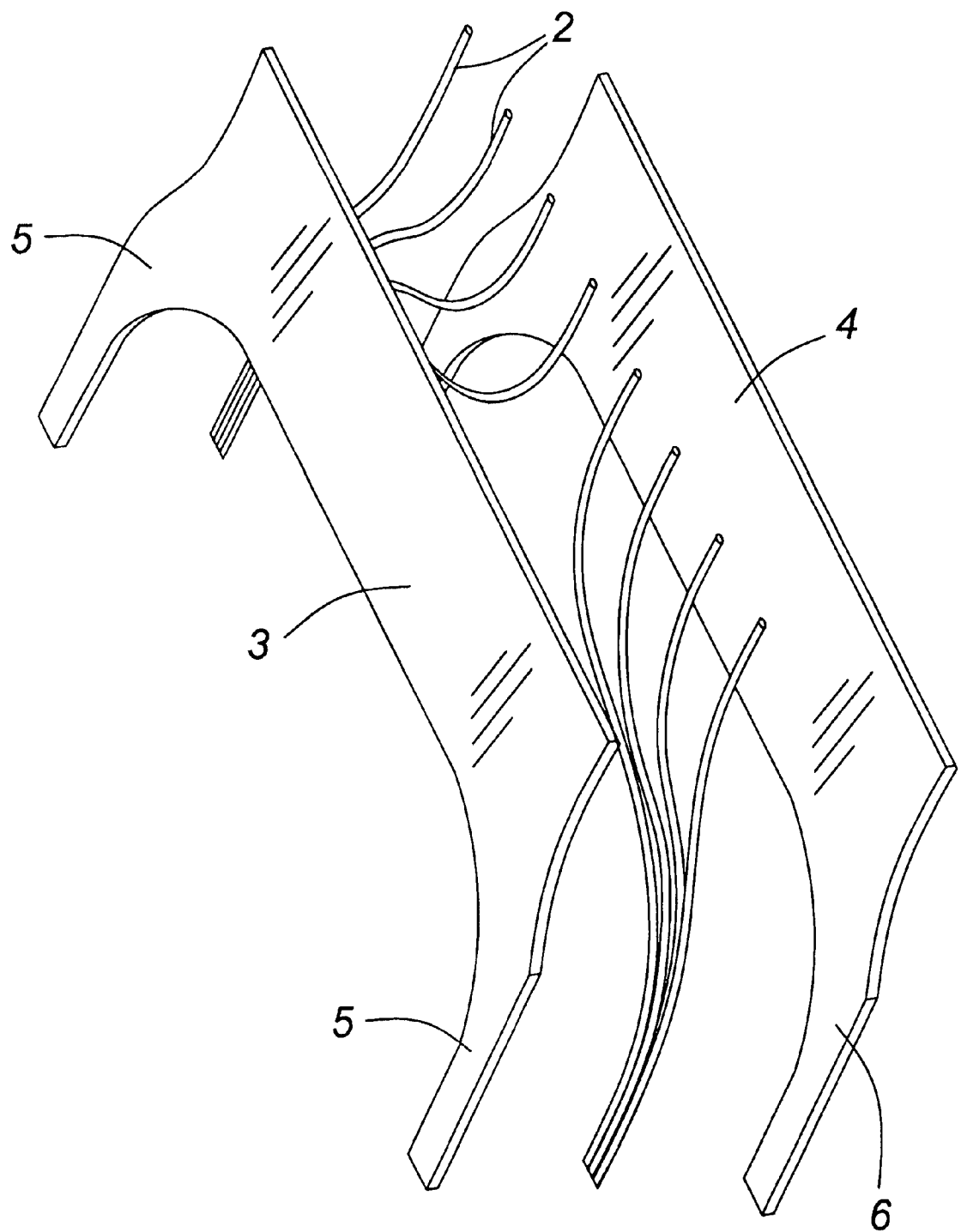
FIG. 2 is an exploded view of the device of FIG. 1.

With reference to FIG. 2, the supporting layers 3 and 4 sandwich a plurality of conduits 2 therebetween. Preferably, the conduits 2 are clear polyethylene tubes sized to accommodate the fiber optical cable with outer cladding intact. The supporting layers 3 and 4 may be polymer sheets, and preferably are made of translucent material, e.g. Kapton™ films. The use of clear polyethylene tubing 2 allows for the observation of the progress of the fiber through the tubing. The polymer sheets 3 and 4 are also translucent for the same reason.

The critical angle for total internal reflection of light launched into an optical fiber cable is dependent upon the refractive index of the outer cladding of the fiber optic cable, the refractive index of the fiber optic core, and the fact that the refractive index of the cladding must be less than the refractive index of the fiber optic core. When the angle of the light launched into an optical fiber is greater than the critical angle, the light has met the criteria for total internal reflection with no loss through the outer cladding. If the waveguide, i.e. the outer cladding in combination with the core optical fiber, keeps the criteria for total internal reflection no loss will take place even if there is some bending of the fiber optic cable. However, if the fiber optic cable is bent beyond the critical radius some portion of the light will escape the cladding and this is called bending loss. Therefore in order to maintain the maximum transmission intensity it is important that the fiber optic cable not be bent past the critical angle. Furthermore, the fiber optic cable may sustain physical damage if it is bent to far, resulting in a complete loss of signal. Therefore, it is important that any system that is used to manage the physical placement of the fiber optic cable take into account the critical bending radius of the fiber.

The clear polyethylene tubing 2 is laid out on the bottom supporting layer 4 in a manner that accommodates the available fiber routing space inside the optical module and the critical radius of the fiber optic cable. Thus the cable will not be bent in a way that may cause any damage thereto or a decrease in transmission throughput. To maximize the number of fibers, the placement of the clear polyethylene tubing on the polymer sheet is fanned out in a symmetric fashion about a central axis. This central axis is parallel to the central axis of the module in which the optical fiber management device is placed. In practice, the shape of the device can be quite arbitrary, depending upon individual module requirements for fiber interconnections at various locations.

Figure 3:
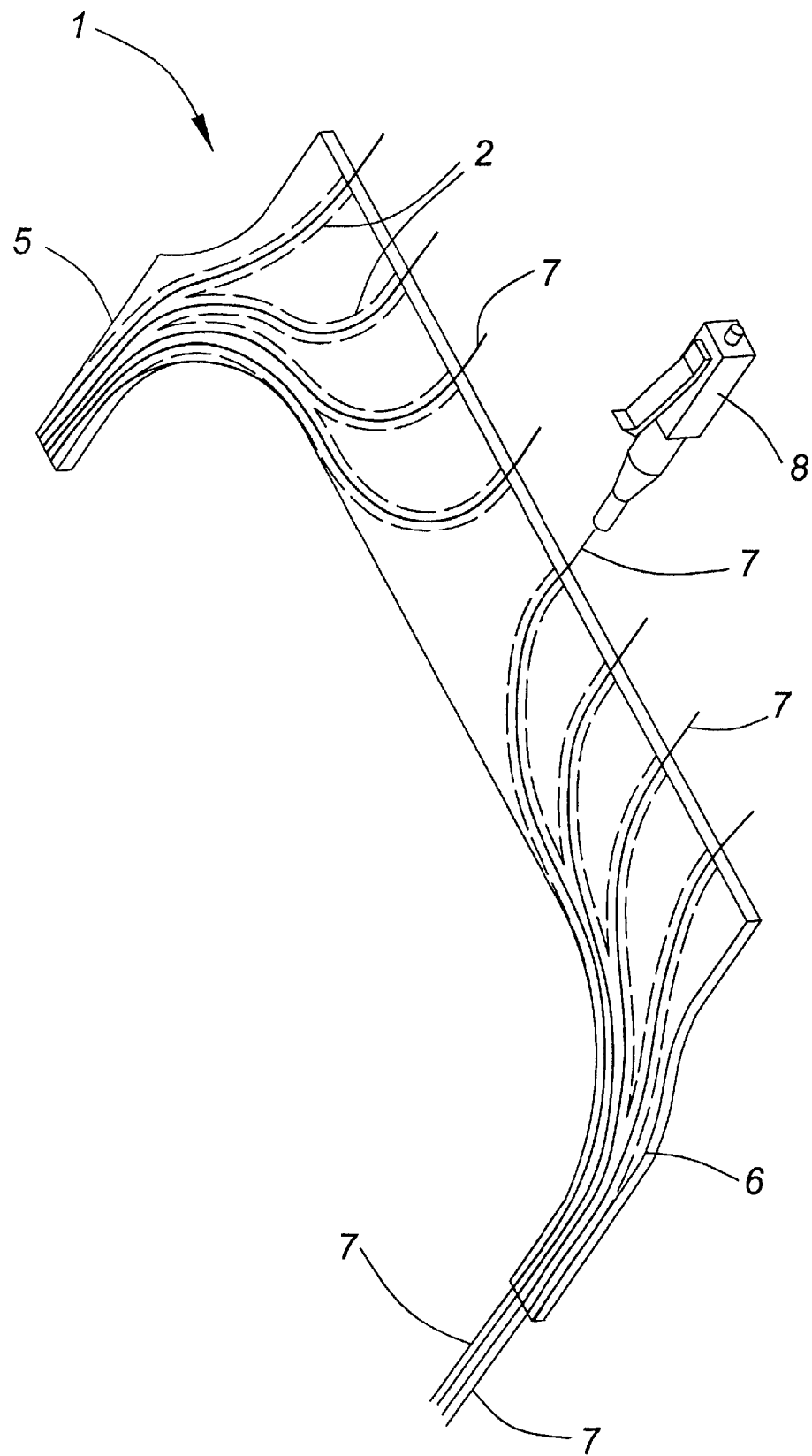
FIG. 3 an isometric view of a second embodiment of the present invention.

With reference to FIG. 3, which illustrates another embodiment of the present invention, the housing 1 has a solid or two-piece construction with the conduits 2 (shown in dotted outline) formed therein without the need for separate tubing. The conduits 2 are molded directly into the housing I or into one half of the housing 1. A connector 8 (only one of which is shown) is attached to the end of one cable 7. The fiber optic cables 7 are guided by the conduits 2, but are not rigidly held therein. Therefore, if the end of one of the fiber optic cables 7 becomes damaged or the individual connector requires replacement and additional fiber is needed to attach a new connector to the fiber optic cable, more fiber optic cable can easily be pulled through.

Figure 4:
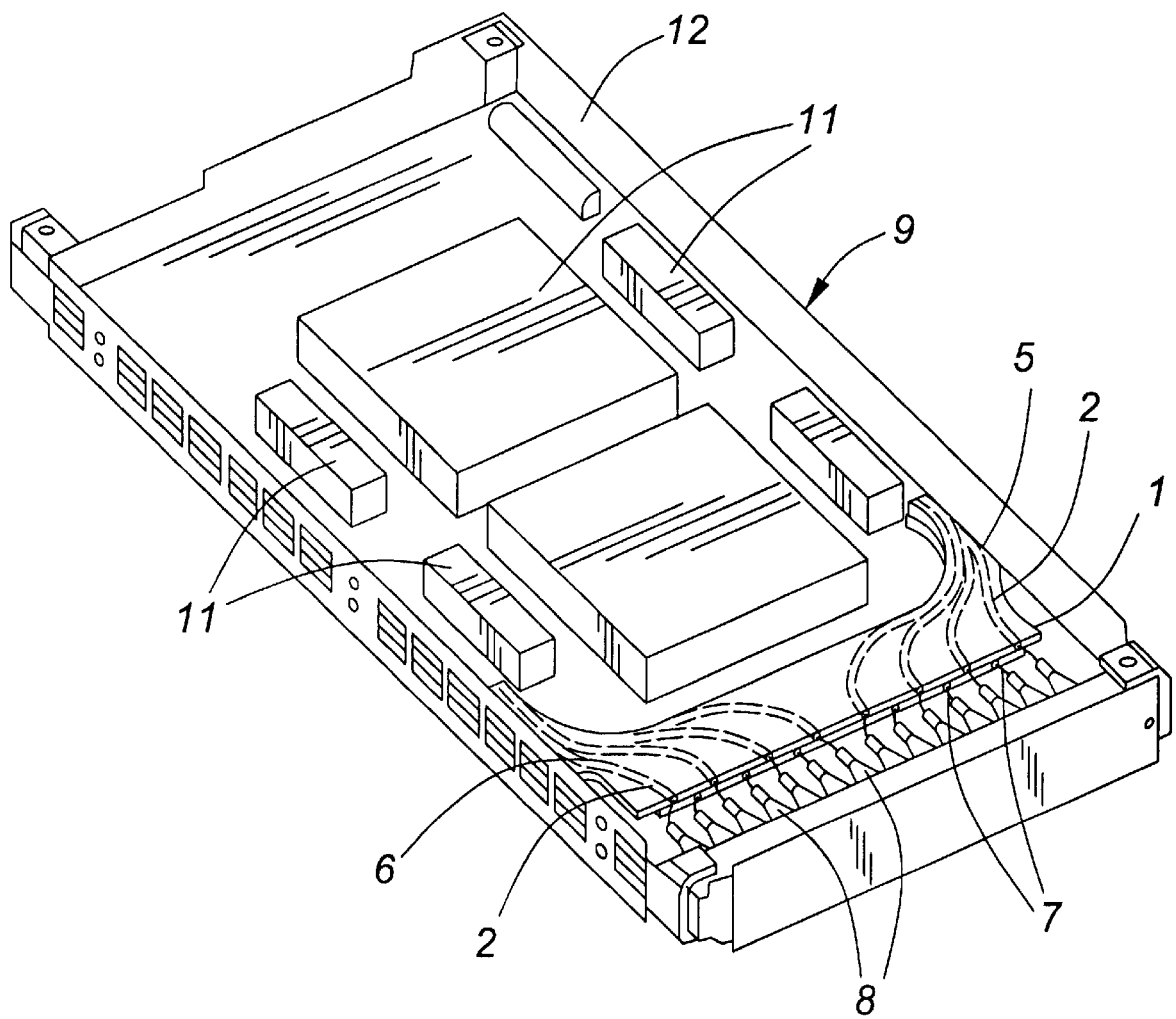
FIG. 4 is an isometric view of the device of FIG. 3 in position in a module.

With reference to FIG. 4, the housing 1 is positioned within a module 9 for routing the fiber optic cable in a manner that facilitates the attachment of the adapters 8. The module 9 includes several components 11, used in the optics industry, e.g. amplifiers, switches, isolators, etc, mounted in a frame 12. Preferably the housing 1 is symmetric about the center axis of the module 9. Thus, the fibers 7 grouped on the left side are fanned out by the conduits in the left side 5 of the housing 1 and the optical fibers 7 grouped on the right side are fanned out by the conduits 2 in the right side 6 of the housing 1. The lateral spacing of the fanned out fibers is dependent upon the number of fibers, the bending radii of the fibers, the size of the connectors, and the physical restraints of the module in which the device is placed. For complicated fiber interconnections involving a large number of fibers, two or more of the devices can be stacked on top of each other. In FIG. 4, two devices are superposed on top of each other, with the top device designed to direct one half of the fibers 7 and the bottom device adapted to receive the other half of the fibers 7.

What we claim is:

1. An optical fiber management device for directing optical fibers in a module and for facilitating the connection of adapters on the ends of the fibers, the module comprising two sides extending between two ends, the optical fiber management device comprising:

substantially planar housing means adapted to be positioned within the module; and a plurality of conduit means extending through said housing means for spreading out a plurality of optical fibers grouped along one side of the module into a spaced apart relationship along one end of the module;

wherein the conduit means are adapted to prevent the fibers from exceeding their critical bending radius; and wherein the fibers are freely slideable in said conduit means.

2. The device according to claim 1, wherein said housing means comprises a first support means and a second support means sandwiching the conduit means therebetween.

3. The device according to claim 2, wherein the first support means is a flexible polymer sheet.

4. The device according to claim 2, wherein the first and second support means are flexible polymer sheets.

5. The device according to claim 3, wherein the first support means is translucent.

6. The device according to claim 1, wherein the conduit means is a plurality of plastic tubes of a size to accommodate the fiber optic cable.

7. The device according to claim 6, wherein the conduit mean is a plurality of clear polyethylene tubes.

8. The device according to claim 1, wherein the conduit means are formed in the housing means.

9. The optical fiber management device according to claim 1, wherein the conduit means spread optical fibers grouped along both sides of the module into a spaced apart relationship along the one end of the module.

* * * * *